United States Patent
Grubelich et al.

(10) Patent No.: US 11,584,841 B1
(45) Date of Patent: Feb. 21, 2023

(54) FLUID-INFUSED ELASTOMERS

(71) Applicant: National Technology & Engineering Solutions of Sandia, LLC, Albuquerque, NM (US)

(72) Inventors: Mark C. Grubelich, Albuquerque, NM (US); Erica Marie Redline, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 68 days.

(21) Appl. No.: 16/576,517

(22) Filed: Sep. 19, 2019

(51) Int. Cl.
*C08K 5/02* (2006.01)
*C08J 7/06* (2006.01)

(52) U.S. Cl.
CPC ............. *C08K 5/02* (2013.01); *C08J 7/065* (2013.01); *C08J 2327/12* (2013.01)

(58) Field of Classification Search
CPC .......... C08J 7/065; C08J 2327/12; C08K 5/02
See application file for complete search history.

(56) References Cited

U.S. PATENT DOCUMENTS

| | | | | |
|---|---|---|---|---|
| 4,269,230 | A * | 5/1981 | Pepper | F16L 45/00 138/89 |
| 5,356,986 | A * | 10/1994 | Stewart | C08K 5/02 524/462 |
| 5,554,680 | A * | 9/1996 | Ojakaar | C08K 3/04 524/496 |
| 2007/0197702 | A1 * | 8/2007 | Nasreddine | C08K 5/02 524/261 |
| 2013/0001016 | A1 * | 1/2013 | Polignone | C10M 107/38 184/6 |

* cited by examiner

*Primary Examiner* — Patrick D Niland
(74) *Attorney, Agent, or Firm* — Daniel J. Jenkins

(57) ABSTRACT

The present invention relates to fluid-infused elastomers that outperform their non-infused base elastomer in harsh environmental conditions. These fluid-infused polymers may be used in applications including geothermal technologies where the oil-infused elastomers may be subject to harsh conditions.

14 Claims, 9 Drawing Sheets

FLUID-INFUSED ELASTOMERS

STATEMENT OF GOVERNMENT INTEREST

The U.S. Government has rights in this invention pursuant to Contract No. DE-NA0003525 between the United State Department of Energy and National Technology and Engineering Solutions of Sandia, LLC, for the operation of the Sandia National Laboratories.

FIELD

The present disclosure is generally directed to elastomers, and more particularly directed to fluid-infused elastomers.

BACKGROUND

Polymers are often used in applications that subject the polymer to harsh environmental chemical, pressure and temperature conditions. Often, the harsh conditions lead to material degradation and loss of performance of the material. These applications include, but are not limited to drilling, sustainable energy, automotive, aerospace, industrial, medical equipment, etc.

For example, geothermal technology is pushing the boundaries of elastomer stability due to harsh environmental conditions, where temperatures of 300° C. and pressures of 5000+ psi are not uncommon. Additionally, well brines and drilling fluids subject elastomer materials to severe chemical environments, which tend to accelerate degradation. Replacement of elastomeric materials due to failure or required pre-emptive periodic maintenance results in expenses ranging from $2000 (materials) up to $1M/day (productivity loss from downtime).

Thus, there is a need to develop robust, high-performance elastomers that reduce operational costs by extending the lifetime and improving the reliability of existing, commercial elastomers.

SUMMARY OF THE DISCLOSURE

The present invention is directed to fluid-infused polymers containing a chemically inert (to the polymer), thermally stable fluid and methods of forming composite polymers by infusing the polymers with chemically inert, thermally stable fluids. These fluids create a barrier between the elastomer and the degradative species/conditions found in harsh environments, such as in down-hole drilling applications. The fluid-infused polymers have enhanced material performance and reliability over their polymers that are not fluid-infused.

According to an embodiment of the disclosure, a material is disclosed that includes an elastomer infused with an amount of a fluid. The amount of the fluid is greater than 0% and less than or equal to 50% by volume of the material.

According to another embodiment of the disclosure, a method of forming a material is disclosed that includes subjecting the material having a surface and a thickness and comprising an elastomer to a temperature and a pressure while submerged in a halocarbon fluid to infuse an amount of the halocarbon fluid into the material to a depth greater than the surface.

One advantage of this disclosure is to provide elastomers having increased reliability, durability, and life extension in harsh environments, such as down-hole drilling environments.

Another advantage of the disclosure is the ability to customize the elastomer/fluid combination for optimization in a given environment (e.g., fluorocarbon-based fluid in hydrocarbon elastomer).

Another advantage of the present disclosure is a potential to decrease the coefficient of friction.

Other features and advantages of the present disclosure will be apparent from the following more detailed description of the preferred embodiment, taken in conjunction with the accompanying drawings which illustrate, by way of example, the principles of the disclosure.

BRIEF DESCRIPTION OF THE DRAWINGS

Wherever possible, the same reference numbers will be used throughout the drawings to represent the same parts.

DETAILED DESCRIPTION

Figure 1A:
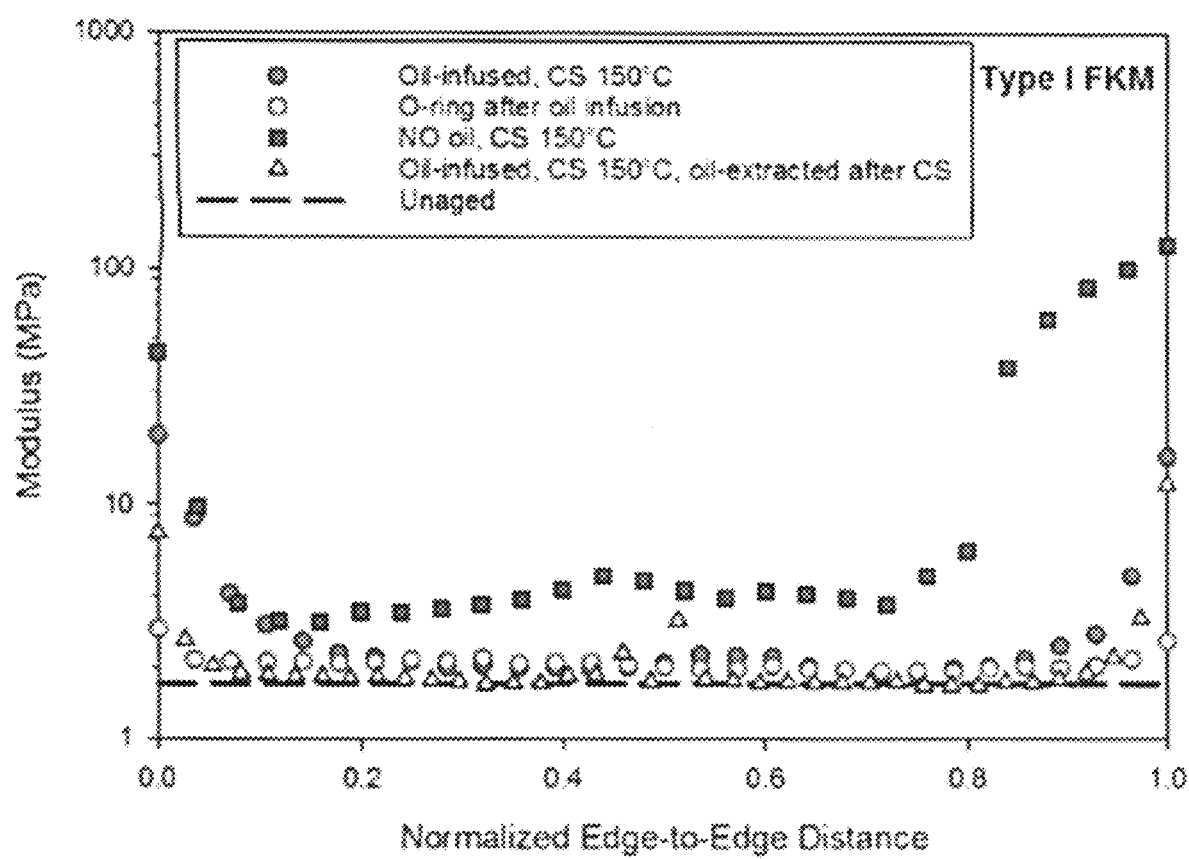
FIG. 1A is a modulus profile of a Type I FKM O-ring cross-section according to an embodiment of the invention.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete and will fully convey the scope of the invention to those skilled in the art.

The present invention is directed to elastomers and methods of making the same wherein the elastomers are infused with a fluid. In an embodiment, the fluid may be an oil. In an embodiment, the elastomer may be a fluorocarbon, hydrocarbon, fluorosilicone or silicone-based elastomer. The infused elastomers have less hardening due to degradation via thermally induced crosslinking, thereby increasing operational temperature range, and reduced saturation from present environmental fluid via decrease in permeability.

Fluid-infused elastomers show an overall reduction in compression set compared to untreated elastomers, implying improved mechanical performance when infused with fluid. In an embodiment, the elastomer may be an O-ring or gasket. Modulus profiles showed that fluid-infused O-rings had less edge hardening (a sign of crosslinking degradation) than those without oil. Profiles of the O-rings after oil infusion did not show a large plasticization effect, if any. Furthermore, extraction of the oil post-compression set testing indicated that the edges did undergo some hardening, but not to the extent of the untreated materials. Additionally, modulus profiles of oil-infused elastomers showed less softening after aging in water at elevated temperatures and pressures than untreated elastomers.

The elastomers may be a fluorocarbon, hydrocarbon, fluorosilicone, or silicone-based elastomers. In an embodiment, the fluorocarbon elastomer may be selected from a group including, but not limited to Type I FKM, Type II FKM, FEPM and FFKM. In an embodiment, the fluorocarbon elastomer may be selected from a group including, but not limited to Viton® A, Viton® B, Aflas®, Tecnoflon®, Fluorel®, Chemraz®, Perlast®, Kalrez®.

In an embodiment, the hydrocarbon elastomer may be selected from a group including, but not limited to EPDM, butadiene, isoprene, ABS co-polymer (acrylonitrile-butadiene-styrene), chloroprene, butyl rubbers and halogenated butyl rubbers, styrene-butadiene, nitrile, hydrogenated nitriles, urethane, epichlorohydrin, ethylene propylene, polyacrylic, polyether block amides, chlorosulfonated polyethylene, ethylene-vinyl acetate. In an embodiment, the elastomer may be selected from a group including Neoprene®, Baypren®, Therban®, Zetpol®, Hypalon®. In another embodiment, the elastomer may be selected from a group including, but not limited to a silicone rubber, such as, but not limited to Elastoseal®, Rhodorsil® and Silopren®) and a fluorosilicone rubber, such as, but not limited to Silastic®.

In an embodiment, the fluid that infuses the elastomer may be a halocarbon fluid (e.g., low viscosity oil or higher viscosity grease), a silicone fluid, or a hydrocarbon fluid. In an embodiment, the halocarbon fluid may be a perfluoroalkylether, perfluoropolyether, polychlorotrifluoroethylene. In an embodiment, the fluid may be a fluorocarbon, chlorocarbon, bromocarbon. In yet another embodiment, the fluid may be selected from a group including, but not limited to Krytox®, Demnum and Halocarbon®. In an embodiment, the silicone fluids may be polydimethylsiloxane, dimethyl silicone, methylhydrogen silicone, methypenyl silicone, cyclic dimethyl silicone. In an embodiment, the silicone fluids may be Molykote®, Dynalene®. In an embodiment, the hydrocarbon fluid may contain N,N'-diphenyl-p-phenylenediamine, petroleum distillates, n-butane, propane, paraffinic oils, paralinic oils, low molecular weight hydrocarbon polymers, etc. In an embodiment, the fluid may be selected from a group including Rheolube®, Nyogel®, Electrolube®, Permatex®.

In an embodiment, the fluorinated oil may be a synthetic oil. In an embodiment, the synthetic, fluorinated oil may be a Krytox GPL 100-107 Oils. These oils are clear, colorless, fluorinated synthetic oils that are nonreactive, nonflammable, safe in chemical and oxygen service, and are long-lasting. Krytox is a perfluoropolyether (PFPE)—also called perfluoroalkylether (PFAE) or perfluoropolyalkylether (PF-PAE). Krytox GPL oils and greases do not damage plastics or elastomers nor cause corrosion to metals. They are commonly used as lubricants in aerospace, automotive, industrial and semiconductor applications as well as in solving many other routine lubrication problems. The polymer chain is completely saturated and contains only carbon, oxygen, and fluorine. On a weight basis, a typical Krytox oil contains 21.6% carbon, 9.4% oxygen, and 69.0% fluorine.

The amount of fluid infused into the elastomer is greater than 0% and less than or equal to 50% by volume of the fluid-infused elastomer. In an embodiment, the amount of fluid may be greater than or equal to 5% and less than or equal to 30%.

The methods to infuse the elastomer include subjecting the elastomer to an elevated temperature, pressure or a combination of the two while submerged or partially submerged in the infusing fluid in an infusion reactor or vessel. In an embodiment, pressure vacuum cycling may be used. An increase in the diameters and mass of the materials indicated oil uptake. In an embodiment, the method may be a high temperature, high pressure infusion method. The temperature at which the elastomer is infused is greater than or equal to −40° C. and less than or equal to 400° C. In an embodiment, the temperature is greater than or equal to −40° C. and less than or equal to 350° C. In another embodiment, the temperature may be greater than or equal to 0° C. and less than or equal to 100° C. In yet another embodiment, the temperature may be greater than or equal to 50° C. and less than or equal to 100° C. In yet another embodiment, the temperature may be greater than or equal to 100° C. and less than or equal to 300° C.

In an embodiment, the pressure is greater than or equal to 0 psi and less than or equal to 10000 psi. In another embodiment, an embodiment, the pressure is greater than or equal to 100 psi and less than or equal to 5000 psi. In another embodiment, the pressure may be greater than or equal to 1000 psi and less than or equal to 3000 psi. In another embodiment, the pressure may be greater than or equal to 1000 psi and less than or equal to 2500 psi.

The fluid is infused to a depth greater than the surface up to the thickness of the component. In an embodiment, the fluid is infused to a depth greater than the surface up to 50% of the component. In an embodiment, the fluid is infused to a depth greater than the surface up to 10% of the component. In an embodiment, the fluid is infused to a depth greater than the surface up to 5% of the component. The term "infused to a depth" means the infusion that takes place during the process of infusing the component in a controlled infusion process environment and excludes infusion and diffusion that may occur under operating conditions of the component.

EXAMPLES

Figure 1B:
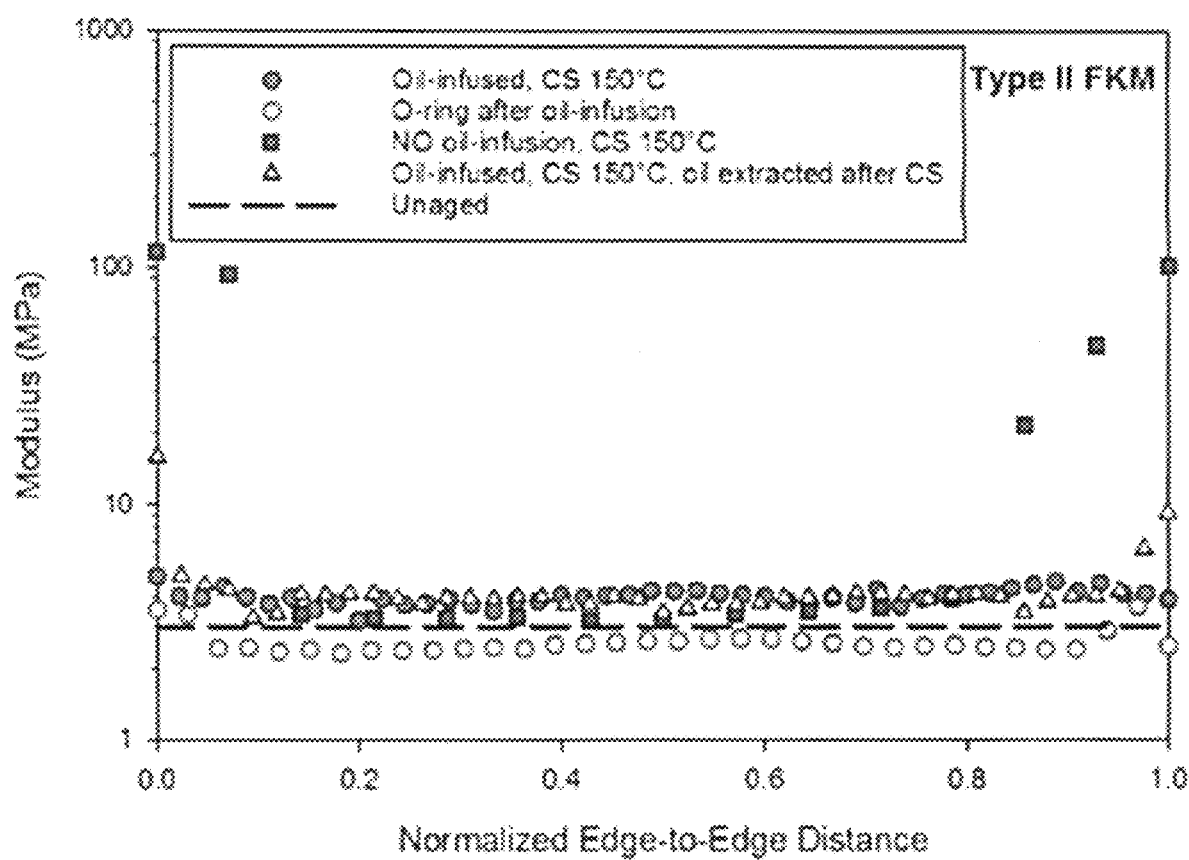
FIG. 1B is a modulus profile of a Type II FKM O-ring cross-section according to an embodiment of the disclosure.
Figure 1C:
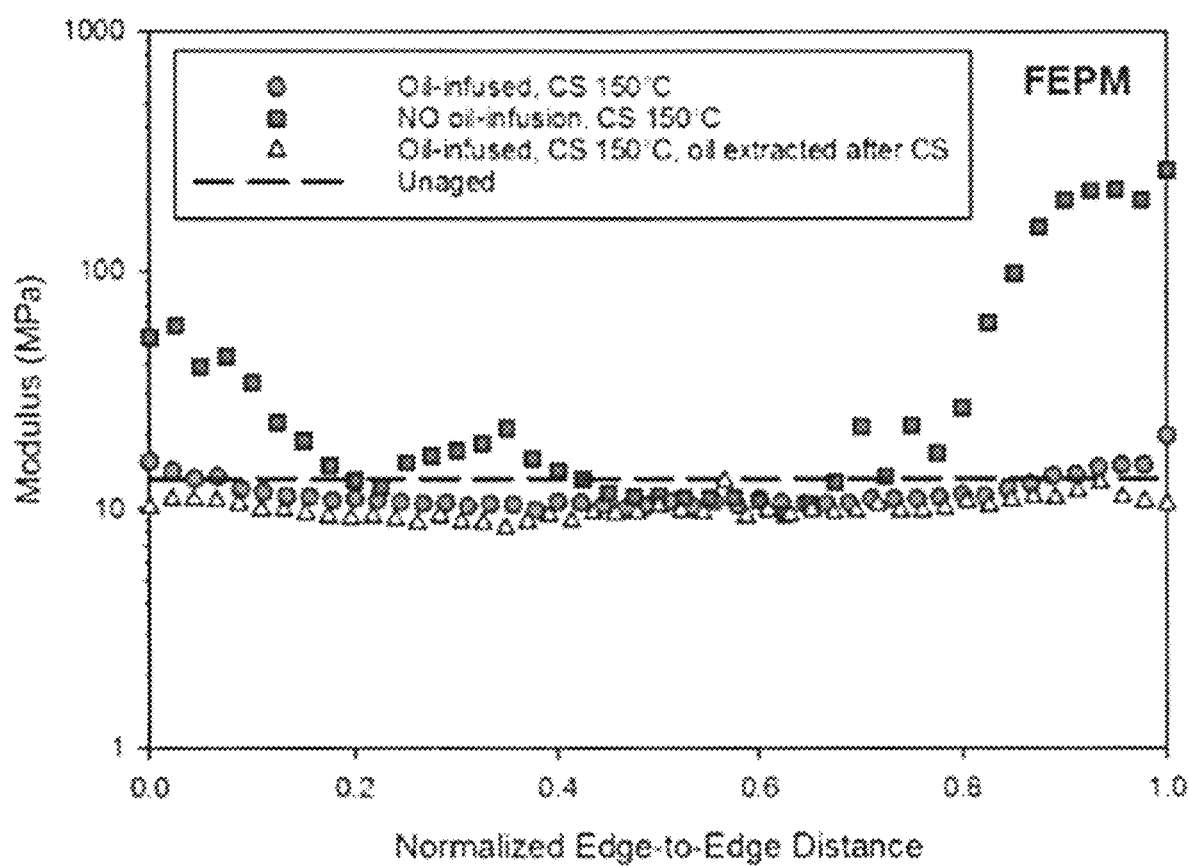
FIG. 1C is a modulus profile of an FEPM O-ring cross-section according to an embodiment of the disclosure.
Figure 2A:
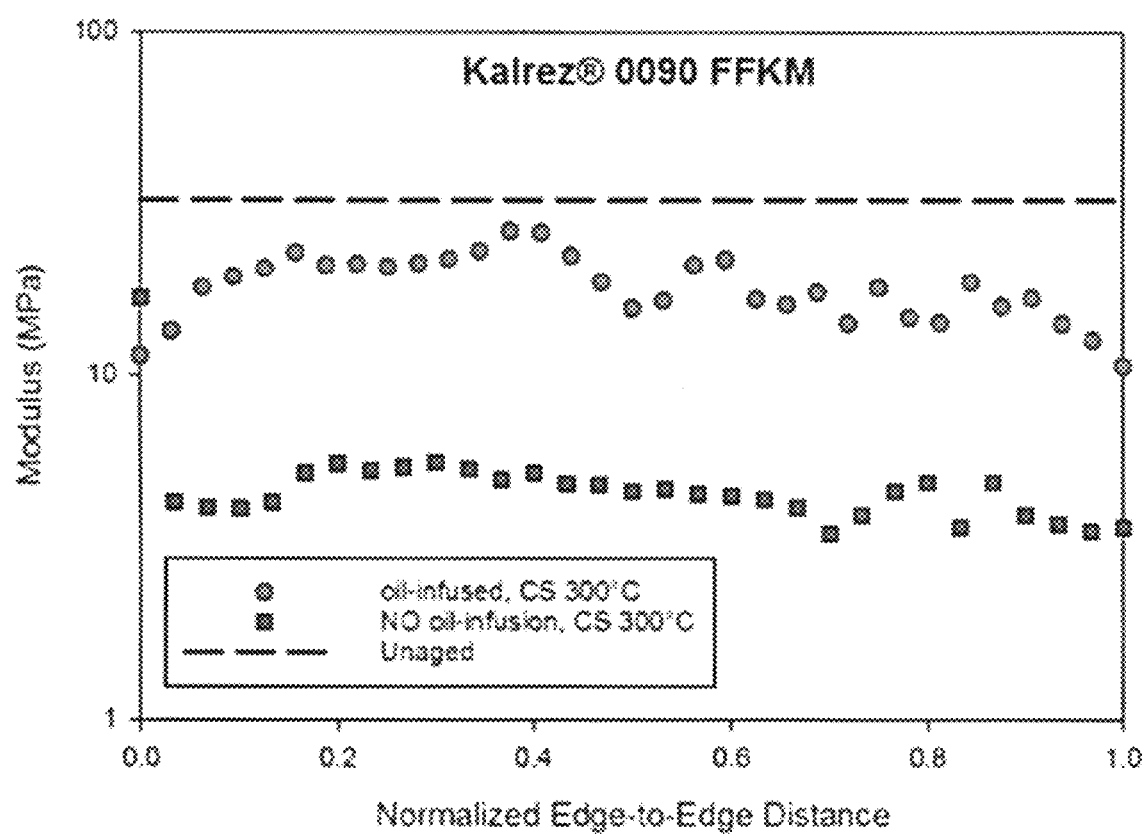
FIG. 2A is a modulus profile of a Kalrez® 0090 O-ring that underwent aging under compression in water at 300° C. and 1350 psi for one week according to an embodiment of the disclosure.
Figure 2B:
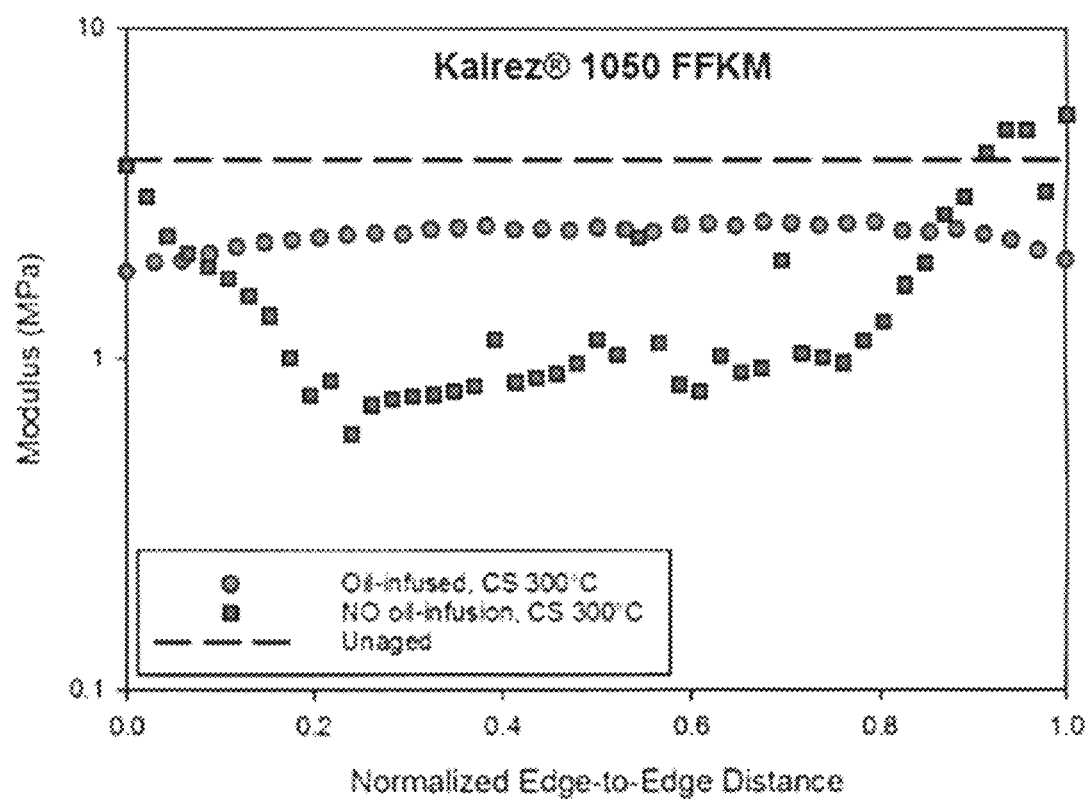
FIG. 2B is a modulus profile of a Kalrez® 1050 O-ring that underwent aging under compression in water at 300° C. and 1350 psi for one week according to an embodiment of the disclosure.
Figure 2C:
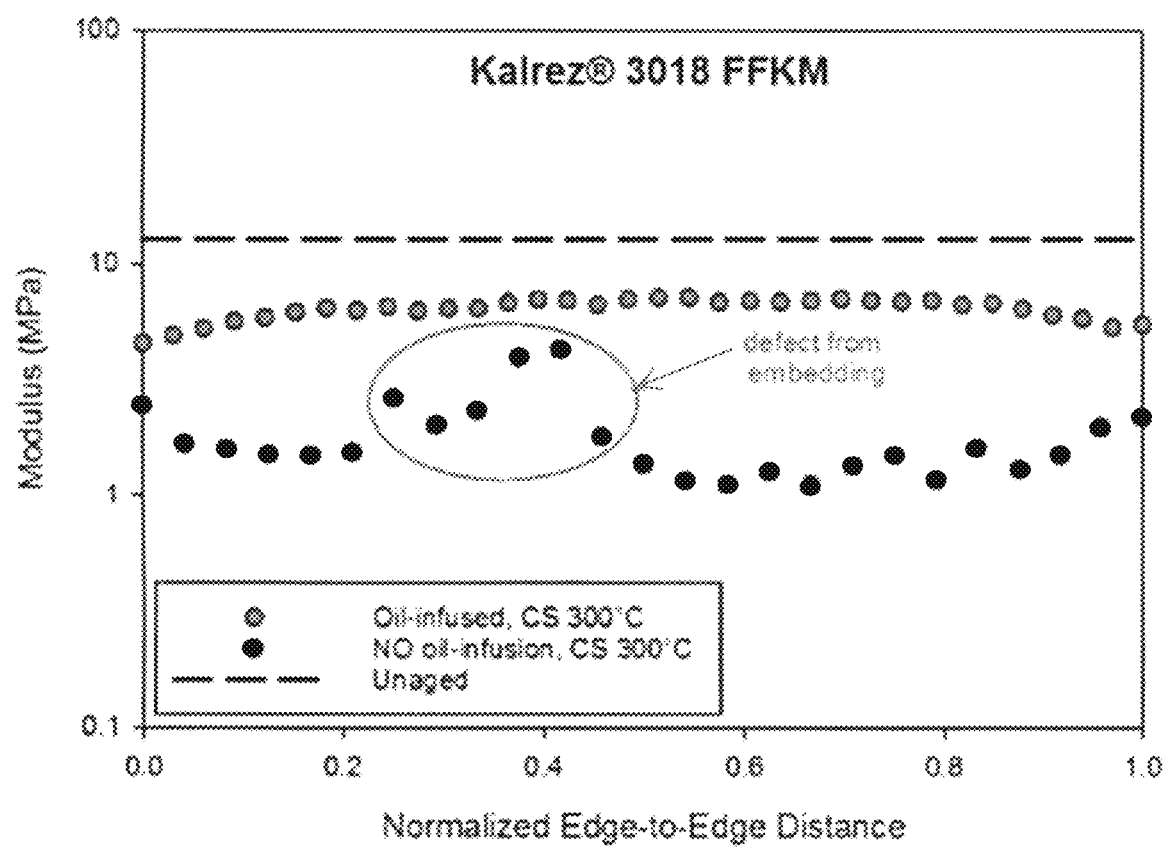
FIG. 2C is a modulus profile of a Kalrez® 3018 O-ring that underwent aging under compression in water at 300° C. and 1350 psi for one week according to an embodiment of the disclosure.
Figure 2D:
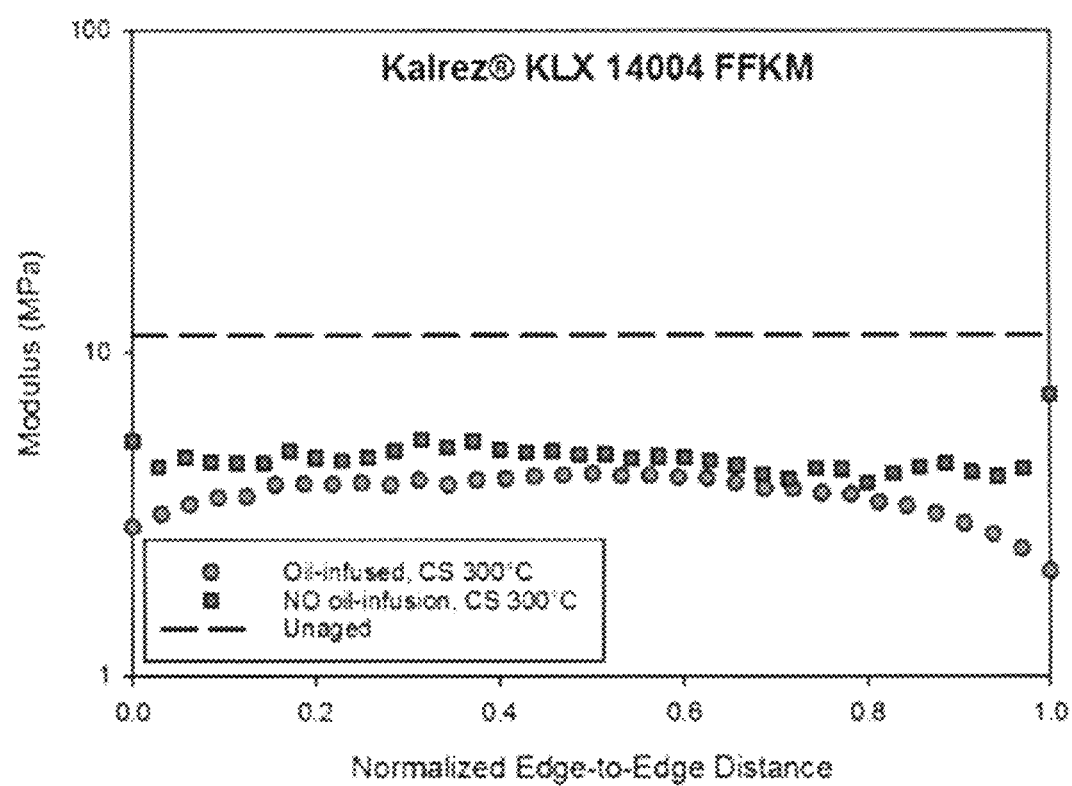
FIG. 2D is a modulus profile of an KLX14004 O-ring that underwent aging under compression in water at 300° C. and 1350 psi for one week according to an embodiment of the disclosure.
Figure 2E:
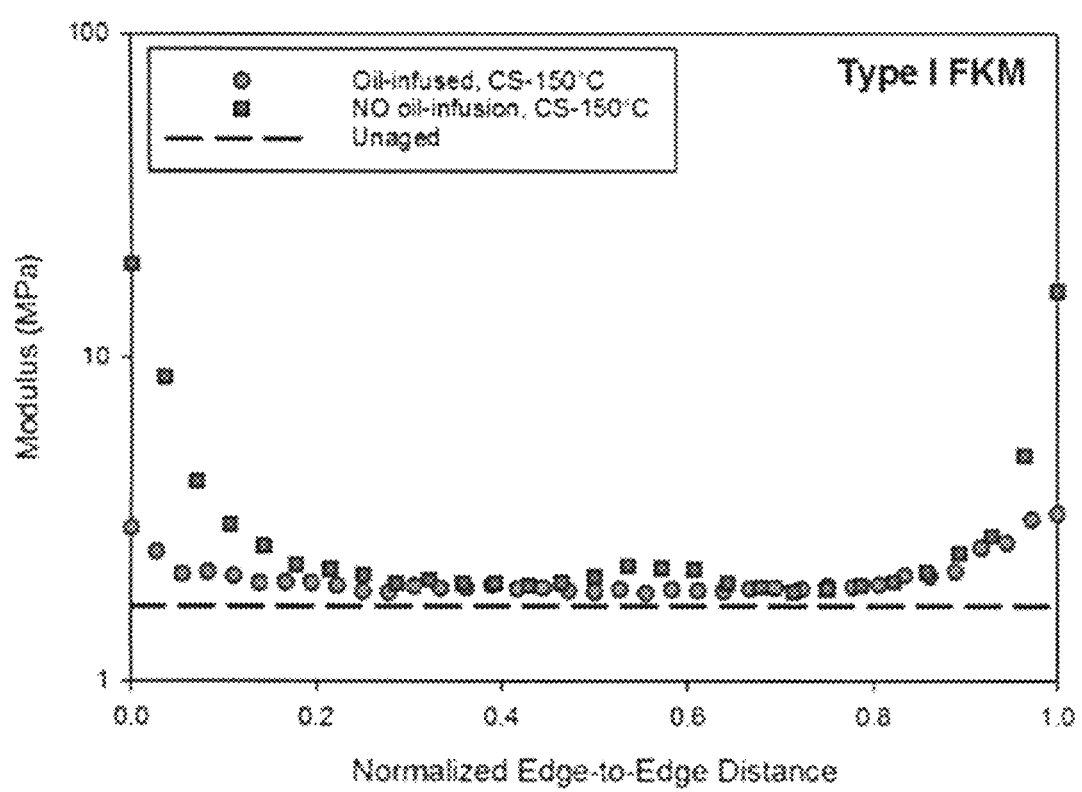
FIG. 2E is a modulus profile of a Type I FKM O-ring aged under compression in water at 150° C. and 1350 psi for one week according to an embodiment of the disclosure.
Figure 2F:
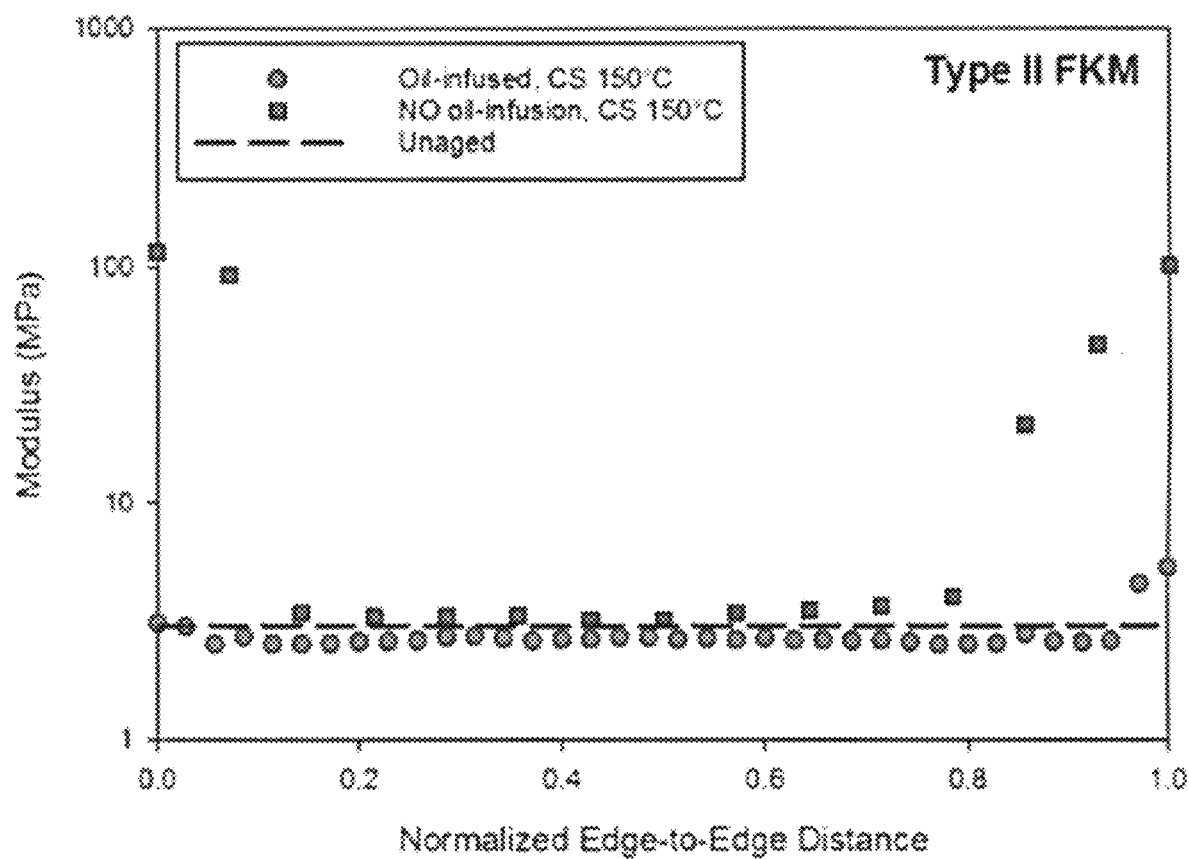
FIG. 2F is a modulus profile of a Type II FKM O-ring aged under compression in water at 150° C. and 1350 psi for one week according to an embodiment of the disclosure.

FIGS. 1A-C show the modulus profiles of Types I and II FKM and FEPM. Profiles included for: unaged, oil-infused (Type I and II FKM only), compression set (CS) tests without oil infusion treatment, CS tests with oil infusion treatment, and O-rings with post-CS testing oil extraction. The oil used in these experiments was Krytox® KP 1-A-2. The FFKM X-ring is not shown as the cross-sectional geometry coupled with dimensional changes makes this type of analysis much more complex. Nevertheless, the three graphs displayed in FIGS. 1A-C offer some clear trends. First, edge hardening is apparent in all of the CS-tested O-rings without oil treatment. The U-shaped profile seen in all of the untreated samples is an indication of diffusion limited oxidation—a process whereby the rate of oxidative degradation (in this case, via a crosslinking mechanism) is greater than the rate of oxygen diffusion into the sample. This type of behavior is generally expected as temperature and sample thickness are increased. Second, oil infusion reduces the amount of edge hardening relative to those samples without oil infusion—the extent of which varies by material. For example, more edge hardening occurred in the oil-infused Type I FKM than either the treated Type II FKM or treated FEPM. Oil infused-FEPM also showed some softening of the interior that could be a plasticization effect and/or a sign of degradation via chain scission. Third, while there may be a slight plasticization by the oil, the overall amount does not appear sufficient enough to account for the total reduction in edge hardening observed with the treated sample (see Types I and II FKM, unfilled circles). Finally, removing the oil from the aged, compression set samples did show evidence of some edge hardening in Type II FKM, and similar extents of hardening to the oil-infused Type I FKM. However, at this time it is unclear what these results might mean as we cannot rule out any additional aging that might have occurred at the 100° C. extraction temperature.

FIG. 2A-F show that FFKM elastomers infused with the higher temperature stability XHT-1000 oil showed less softening than non-treated samples after aging at 300° C. The exception to this was the Kalrez® KLX 14004 polymer, which had slightly more softening at the edges than the untreated sample. Types I and II FKM were only aged at 150° C. as a precaution to prevent hydrofluoric acid formation. Again, the oil-infused samples showed less edge hardening than the samples without oil. However, none of these materials underwent the extraction process to rule out plasticization effects. FIGS. 2A-F show the modulus of the unaged polymers (dashed line), along with aged, untreated (square) versus aged, treated elastomers (circles). The oil used in these experiments was Krytox® XHT-1000.

The fluid-infused elastomers of this disclosure may be used as an O-ring or other seal, square seals, lip seals, quad seals, bushings, etc. Examples include static and dynamic seals, pumps, pressure vessels, bearings, shafts, electrical insulation, hydraulic systems, motors, engines, transmissions, down-hole equipment for oil, gas and geothermal.

The invention being thus described, it will be obvious that the same may be varied in many ways. Such variations are not to be regarded as a departure from the spirit and scope of the invention, and all such modifications as would be obvious to one skilled in the art are intended to be included within the scope of the appended claims. It is intended that the scope of the invention be defined by the claims appended hereto. The entire disclosures of all references, applications, patents and publications cited above are hereby incorporated by reference.

In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

What is claimed is:

1. A material, consisting essentially of:
    an elastomer infused with an amount of a fluid;
    wherein the amount of the fluid is greater than 0% and less than or equal to 50% by volume of the material;
    wherein the elastomer is selected from the group consisting of fluorocarbon, hydrocarbon, fluorosilicone and silicone-based elastomers; and
    wherein the fluid is a halocarbon selected from a group consisting of fluorocarbon, chlorocarbon and bromocarbon-based oils; and
    wherein the fluid is chemically inert with the elastomer; and
    wherein the material has a thickness, and wherein the fluid is infused to a depth greater than the surface up to and including to a depth of 10 percent the thickness of the material.

2. The material of claim 1, wherein the halocarbon fluid is a fluorocarbon-based fluid.

3. The material of claim 1, wherein the fluorocarbon-based fluid is a perfluoropolyether.

4. The material of claim 1, wherein the elastomer is a fluorocarbon-based elastomer and the fluid is a fluorocarbon-based oil.

5. The material of claim 1, wherein the amount of the fluid is greater than 5% and less than or equal to 30% by volume of the material.

6. The material of claim 1, wherein the material is an O-ring or gasket.

7. A method of forming a material, comprising:
    subjecting the material having a surface and a thickness and consisting essentially of an elastomer to a temperature and a pressure while submerged in a halocarbon fluid to infuse an amount of the halocarbon fluid into the material to a depth greater than the surface;
    wherein the elastomer is selected from the group consisting of fluorocarbon, hydrocarbon, fluorosilicone and silicone-based elastomers; and
    wherein the halocarbon fluid is selected from the group consisting of fluorocarbon, chlorocarbon and bromocarbon-based oils; and
    wherein the halocarbon fluid is chemically inert with the elastomer; and
    wherein the material has a thickness, and wherein the fluid is infused to a depth greater than the surface up to and including to a depth of 10 percent the thickness of the material.

8. The method of claim 7, wherein the temperature is between 100° C. and 350° C.

9. The method of claim 7, wherein the material has a thickness, and wherein the fluid is infused to a depth greater than the surface up to and including to a depth of 50 percent the thickness of the material.

10. The method of claim 7, wherein the fluid is infused to an amount greater than 5% and less than or equal to 30% by volume of the material.

11. The method of claim 7, wherein the halocarbon fluid is a fluorocarbon-based fluid.

12. The method of claim 7, wherein the fluid is a fluorocarbon-based fluid and the fluorocarbon-based fluid is a perfluoropolyether.

13. The method of claim 7, wherein the elastomer is a fluorocarbon-based elastomer and the fluid is a fluorocarbon-based oil.

14. The method of claim 7, wherein the infusion takes place in an infusion reactor.

* * * * *